(12) United States Patent
Stockmeier et al.

(10) Patent No.: US 10,384,724 B1
(45) Date of Patent: Aug. 20, 2019

(54) COVER FOR REGULATOR (71) Applicant: Honda Motor Co., Ltd., Tokyo (JP)

(72) Inventors: Kevin C. Stockmeier, Marysville, OH (US); Michael J. Griffin, Dublin, OH (US); Michael V. Peterson, Marysville, OH (US); Samira S. Johnson, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/044,900

(22) Filed: Jul. 25, 2018

(51) Int. Cl.
*B60K 11/08* (2006.01)
*H02K 19/36* (2006.01)
*B62D 25/16* (2006.01)
*B60K 11/06* (2006.01)
*B60K 1/00* (2006.01)

(52) U.S. Cl.
CPC ............ *B62D 25/168* (2013.01); *B60K 11/06* (2013.01); *B60K 11/08* (2013.01); *B60K 2001/003* (2013.01); *H02K 19/365* (2013.01)

(58) Field of Classification Search
CPC .. B60K 17/145; B60K 17/046; B60K 17/043; B60K 7/0007; B60K 2007/0092; B60K 2007/0038; B60L 50/66; B60B 27/0015; B60B 3/08; G05D 1/0022; F16H 1/28; H04B 7/24
See application file for complete search history.

(56) References Cited

U.S. PATENT DOCUMENTS 6,218,804 B1 * 4/2001 Toriyama .............. F02N 15/006
123/198 R
7,549,676 B2 * 6/2009 Uchiyama ................ B62K 5/01
180/291
7,680,564 B2 * 3/2010 Kawamura ................ B62J 6/18
307/10.1
8,579,064 B2 11/2013 Oohashi et al.
8,622,161 B2 1/2014 Hara
2004/0084235 A1 * 5/2004 Heinen ................ B60K 7/0007
180/65.51
2007/0296378 A1 * 12/2007 Oodachi ................ B62K 19/30
322/28
2008/0278868 A1 * 11/2008 Morino .................... G05F 1/573
361/18
2009/0046404 A1 * 2/2009 Morino .................... G05F 1/573
361/93.9

(Continued)

OTHER PUBLICATIONS

"Anyone Mount Their Amps in the Wheels Well" https://www.filfreak.net/forums/fit-interior-modifications/28635-anyone-mount-there-amps-wheel-well.html (Accessed Mar. 15, 2018).

*Primary Examiner* — Erez Gurari (74) *Attorney, Agent, or Firm* — Honda Patents & Technologies North America, LLC; Mark E. Duell (57) ABSTRACT

A vehicle includes a vehicle frame, a body on the vehicle frame, the vehicle frame and the body defining a wheel well, a wheel disposed in the wheel well, an engine for propelling the vehicle, and an electrical system for providing electrical power to the engine. The electrical system includes a regulator for maintaining a constant voltage across the electrical system located in the wheel well. A cover is located in the wheel well between the regulator and the wheel. An air intake is located in the body for directing airflow into a portion of the wheel well defined by the cover and housing the regulator to cool the regulator.

20 Claims, 7 Drawing Sheets

(56) References Cited

U.S. PATENT DOCUMENTS

| | | | |
|---|---|---|---|
| 2014/0015489 A1* | 1/2014 | Pardue | H02J 7/16 |
| | | | 320/123 |
| 2014/0159468 A1* | 6/2014 | Heinen | B60K 7/0007 |
| | | | 301/6.3 |
| 2017/0087978 A1 | 3/2017 | Tako | |
| 2017/0282989 A1* | 10/2017 | Niijima | B62J 15/00 |
| 2018/0030878 A1* | 2/2018 | Jyouzaki | B60K 11/08 |

* cited by examiner

COVER FOR REGULATOR

TECHNICAL FIELD

The embodiments disclosed herein are directed to a cover for protecting an electrical component in a vehicle, and more specifically a cover for protecting an electrical component located in a wheel well of a side-by-side utility vehicle.

BACKGROUND

Vehicles of the type typically described as side-by-side all-terrain vehicles may include a frame, a body, and an engine for supplying power, which may be located beneath and rearward of a cabin where the driver and a passenger may be seated during operation of the vehicle.

The typical engine includes a plurality of cylinders and an electrical system for operating the cylinders. An electronic control unit (ECU) distributes electrical power to each of the cylinders of the engine. In order to maintain constant voltage across the ECU, the vehicle may be equipped with a regulator. The regulator maintains constant voltage application across the ECU, but is susceptible to overheating and needs to be cooled. The regulator for the electrical system may be located in a wheel well of the vehicle. However, due to its location in the wheel well, the regulator is further susceptible to damage from debris thrown by a tire on the wheel disposed in the wheel well. Therefore, there exists a need for a cover to protect the regulator from debris without preventing the regulator from being cooled.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a vehicle includes a vehicle frame, a body on the vehicle frame, the vehicle frame and the body defining a wheel well, a wheel disposed in the wheel well, an engine for propelling the vehicle, an electrical system for providing electrical power to the engine including a regulator for maintaining a constant voltage across the electrical system, the regulator being disposed in the wheel well, a cover disposed in the wheel well between the regulator and the wheel, and an air intake disposed in the body for directing airflow into a portion of the wheel well defined by the cover and housing the regulator.

According to another aspect, a vehicle including a vehicle frame, a body on the vehicle frame, the vehicle frame and the body defining first and second rear wheel wells, first and second front wheels rotatably attached to the vehicle frame, first and second rear wheels rotatably attached to the vehicle frame, the first rear wheel being disposed in the first rear wheel well and the second rear wheel being disposed in the second rear wheel well, an engine for propelling the vehicle, an electrical system for providing electrical power to the engine including a regulator for maintaining a constant voltage across the electrical system, the regulator being disposed in the first rear wheel well, a cover disposed in the first rear wheel well between the regulator and the first rear wheel, and an air intake disposed in the body for directing airflow into a portion of the first rear wheel well defined by the cover and housing the regulator.

According to yet another aspect, a vehicle includes a vehicle frame, a body on the vehicle frame, the vehicle frame and the body defining first and second rear wheel wells, first and second front wheels rotatably attached to the vehicle frame, first and second rear wheels rotatably attached to the vehicle frame, the first rear wheel being disposed in the first rear wheel well and the second rear wheel being disposed in the second rear wheel well, an engine for propelling the vehicle, an electrical system for providing electrical power to the engine including a regulator for maintaining a constant voltage across the electrical system, the regulator being disposed in the first rear wheel well, and a cover disposed in the first rear wheel well between the regulator and the first rear wheel.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
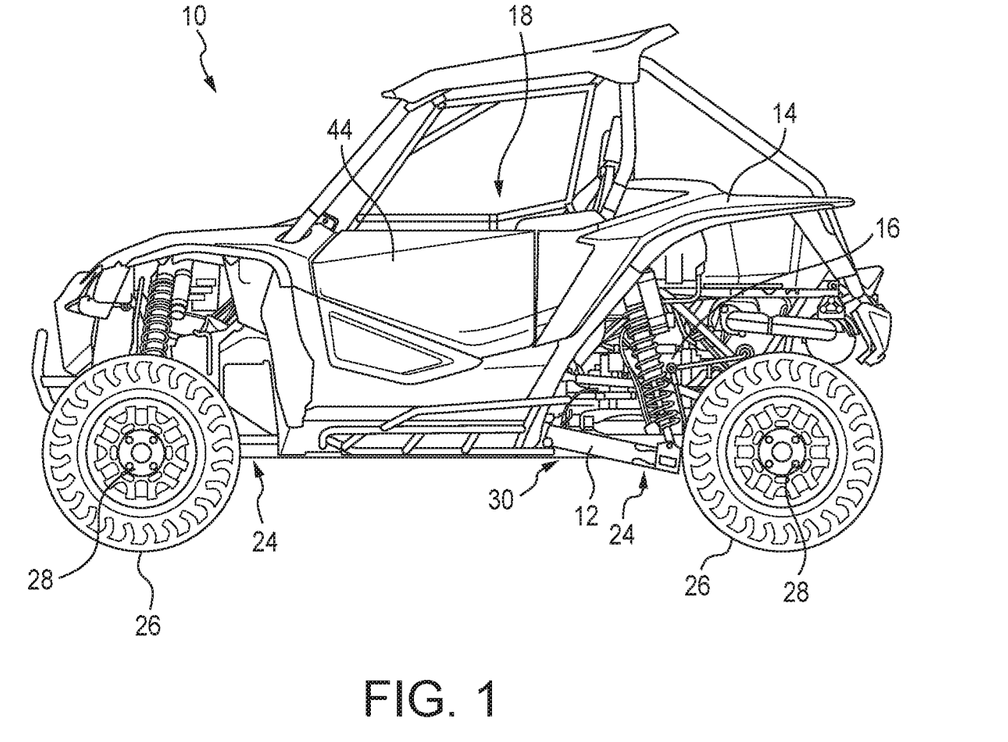
FIG. 1 is a side view of a vehicle of the type typically described as a side-by-side utility vehicle.

FIG. 1 illustrates a side view of a vehicle 10 of the type typically described as a side-by-side all-terrain vehicle. The vehicle 10 may include a frame 12, such as a tubular welded frame, and a body 14, which may be constructed from a number of plastic, steel, aluminum, or composite body panels, that are attached to the frame 12. The vehicle 10 is powered by an engine 16, which in the embodiment illustrated herein, is located below longitudinally rearward of the vehicle cabin 18 where the driver and a passenger may be seated during operation of the vehicle 10. The engine 16 operates to rotate wheels 28, which include tires 26, that are located in wheel wells 24 of the vehicle 10.

Figure 2:
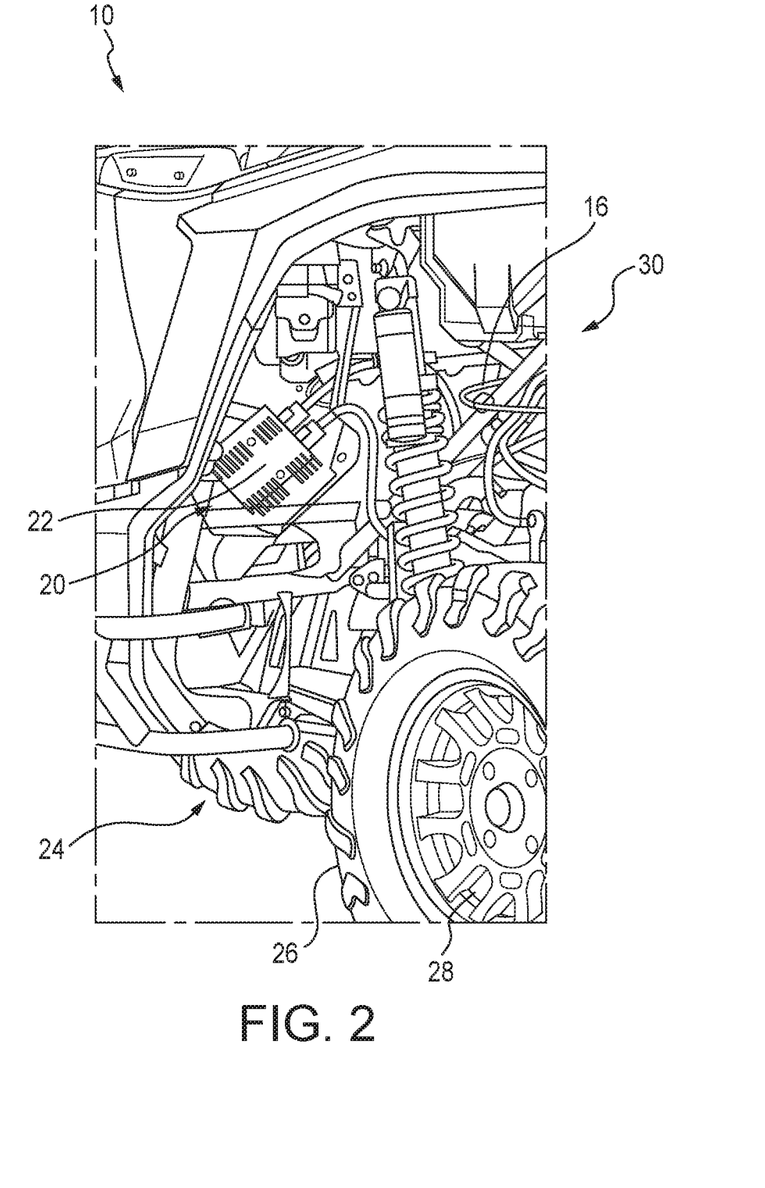
FIG. 2 is a rear perspective view of a wheel well of the vehicle of FIG. 1 with a view of a regulator for use with the vehicle's electrical system.

FIG. 2 illustrates a close up view of a portion of the electrical system 20 that provides electrical power to the engine 16. The typical engine 16 includes a plurality of cylinders (not shown), and the electrical system 20 of the vehicle 10 may include an electronic control unit (ECU) (not shown) to distribute electrical power to each of the cylinders of the engine 16. In order to maintain constant voltage across the ECU, the vehicle 10 may be equipped with a regulator 22. The regulator 22 maintains constant voltage application across the ECU, but is susceptible to overheating and needs to be cooled. In the embodiment illustrated, the regulator 22 for the electrical system 20 is located in a wheel well 24 of the vehicle 10. The regulator 22 is located in a left rear wheel well 30 in the embodiment illustrated in FIG. 1, although this positioning could be in any wheel well 24 on the vehicle 10 based on the preferred engine 16 location and layout as dictated by the design of the vehicle 10.

Figure 3:
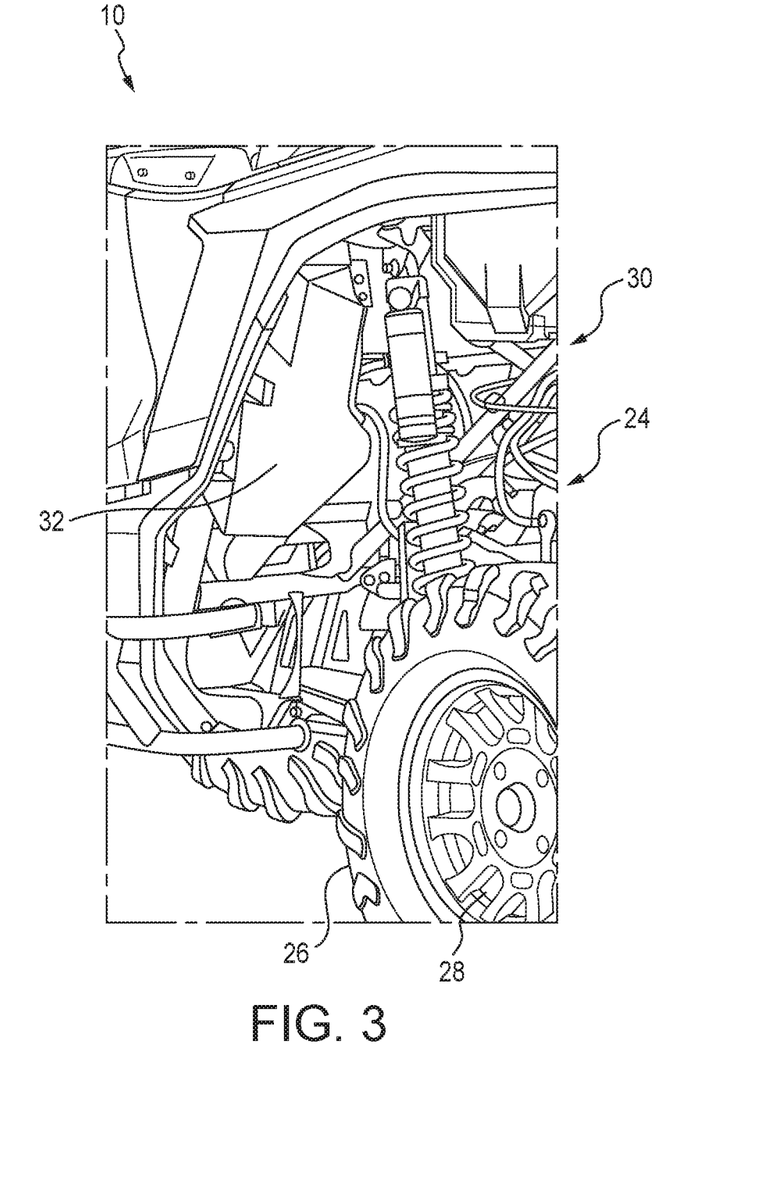
FIG. 3 is a rear perspective view of the wheel well of FIG. 2 illustrating a cover to protect the regulator from debris.

However, due to its location in the wheel well 24, the regulator 22 is further susceptible to damage from debris thrown by a tire 26 on the wheel 28 disposed in the wheel well 24. Therefore, as shown in FIG. 3, a cover 32 may be applied to protect the regulator 22 from debris. The cover 32 is designed to be substantially concave to cover the regulator 22.

Figure 4:
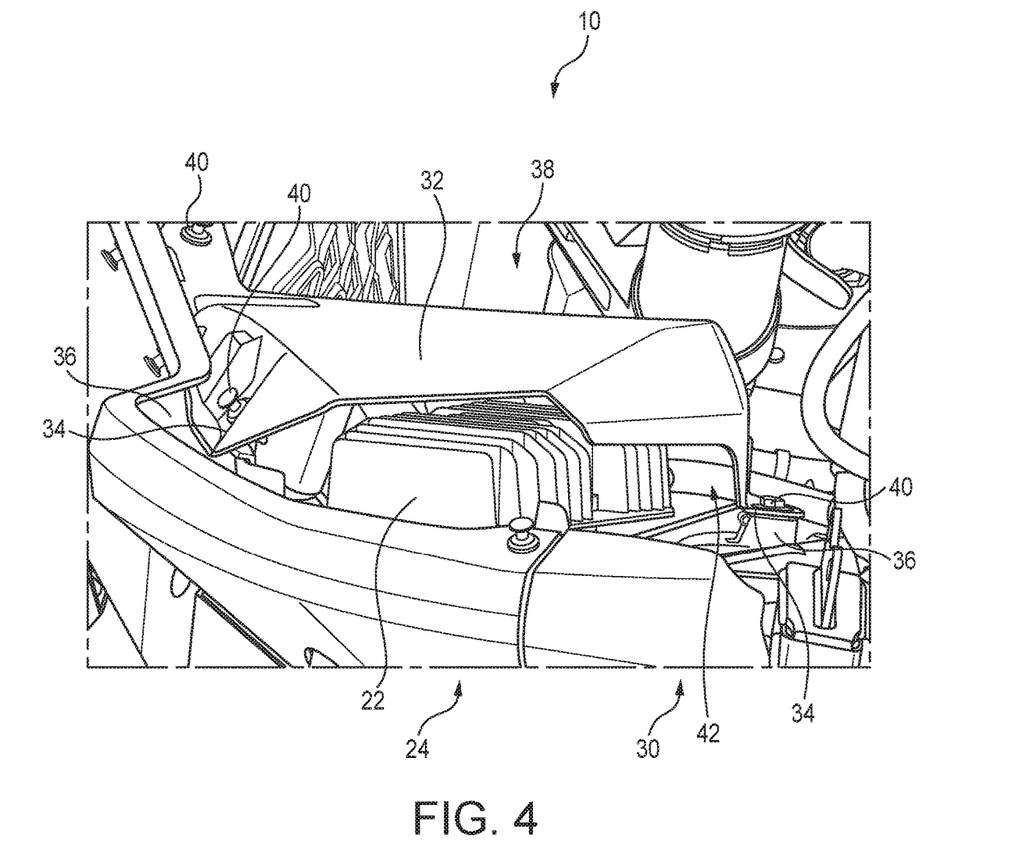
FIG. 4 is a bottom view of the cover and regulator in the wheel well of the vehicle as illustrated in FIG. 3.

As additionally illustrated in FIG. 4, which is a bottom view of the cover 32, the cover 32 further may include an outer edge 34 that is designed to match a corresponding surface 36 of the interior 38 of the wheel well 24, the left rear wheel well 30 in the illustrated embodiment. The cover 32 may be attached to the corresponding surface 36 of the interior 38 of the wheel well 24 by any suitable fasteners 40, such as nut and bolt fasteners, screws, rivets, welds, and the like. The cover 32 may be constructed of plastic, steel, stainless steel, aluminum, or any other suitable material.

The cover 32 may also include an outlet 42 to enable the passage of cooling air over and away from the regulator 22 during operation of the vehicle 10. The vented areas 42 are positioned such that debris thrown by the tire 26 or wheel 28 disposed in the wheel well 24 does not enter the cover 32 and damage the regulator 22 during normal operation of the vehicle 10.

Figure 5:
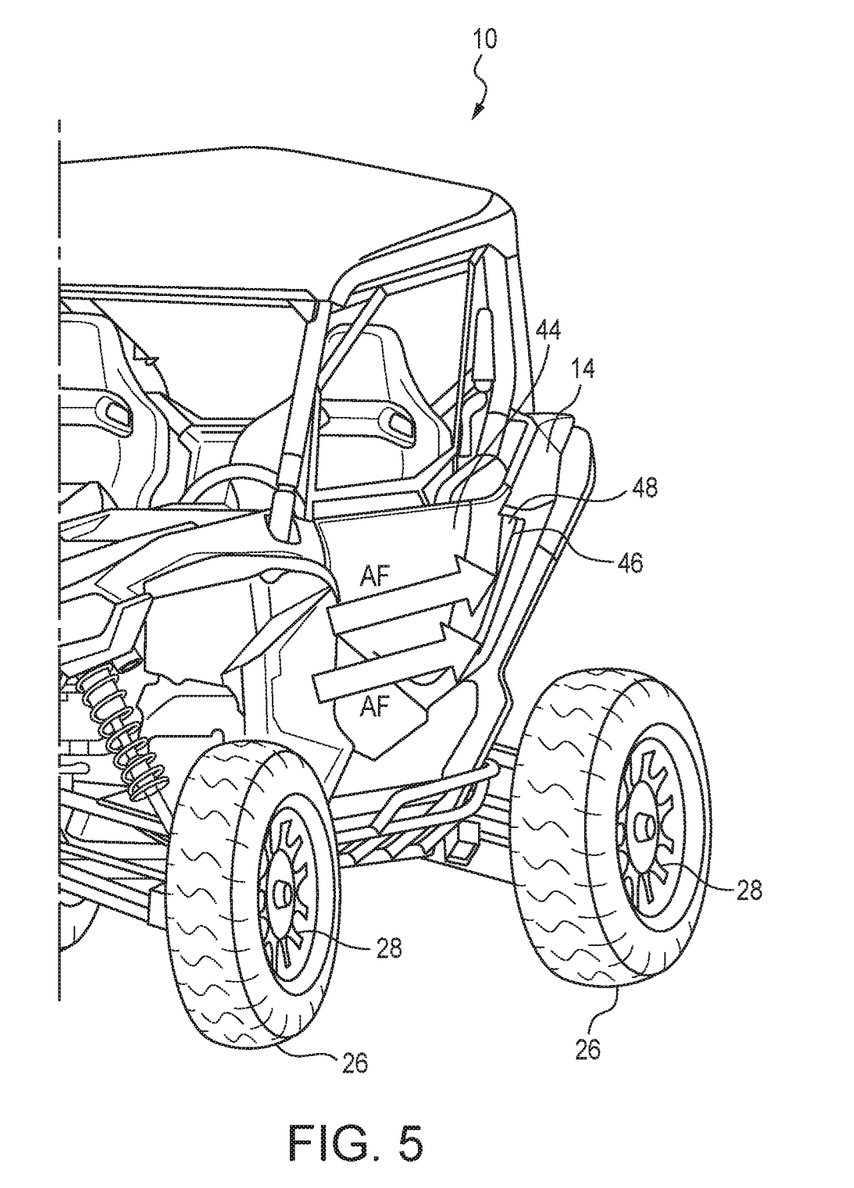
FIG. 5 is a front perspective view of the vehicle of FIG. 1 illustrating airflow into an air intake for cooling the regulator.
Figure 6:
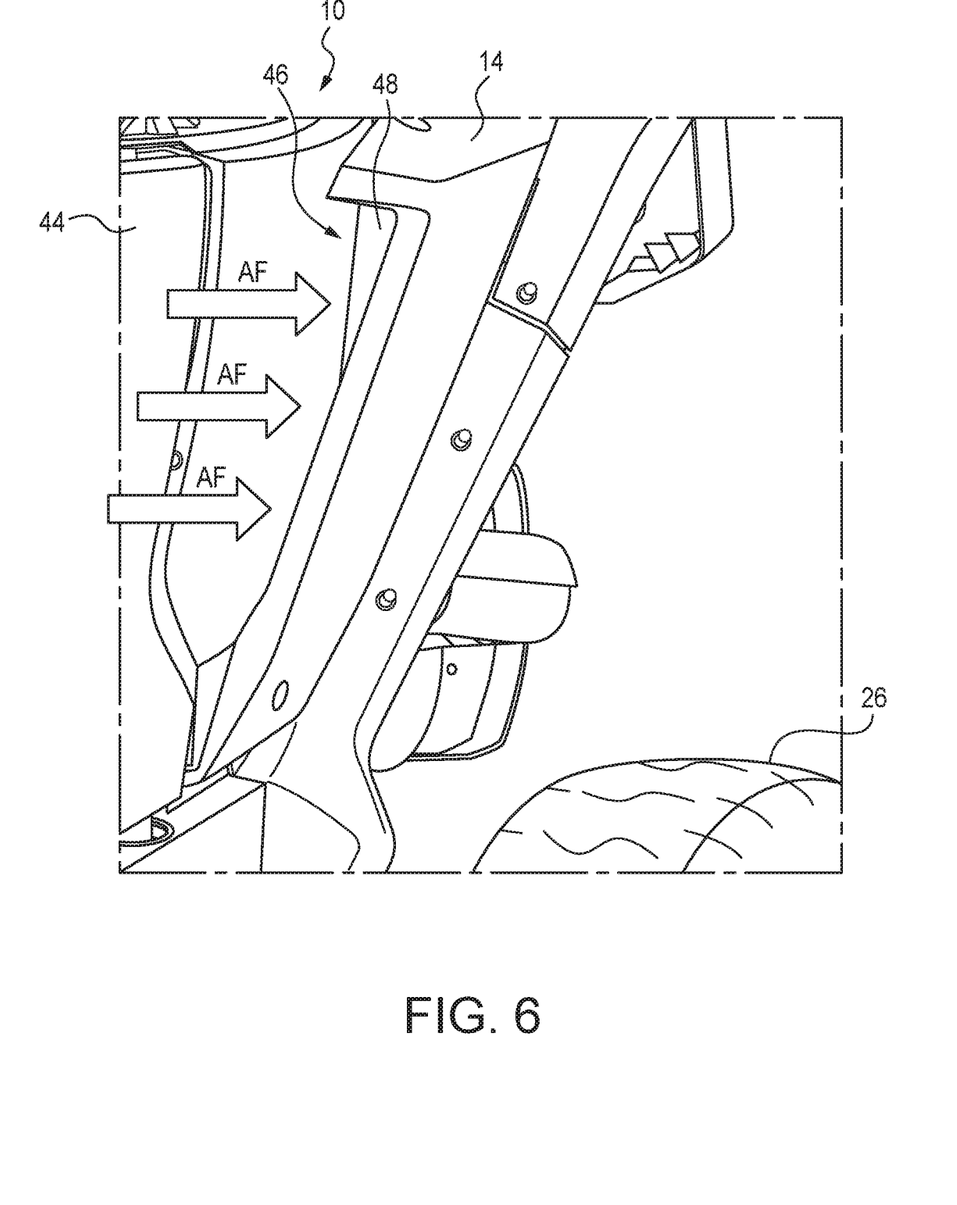
FIG. 6 is a close up view of the air intake of FIG. 5.
Figure 7:
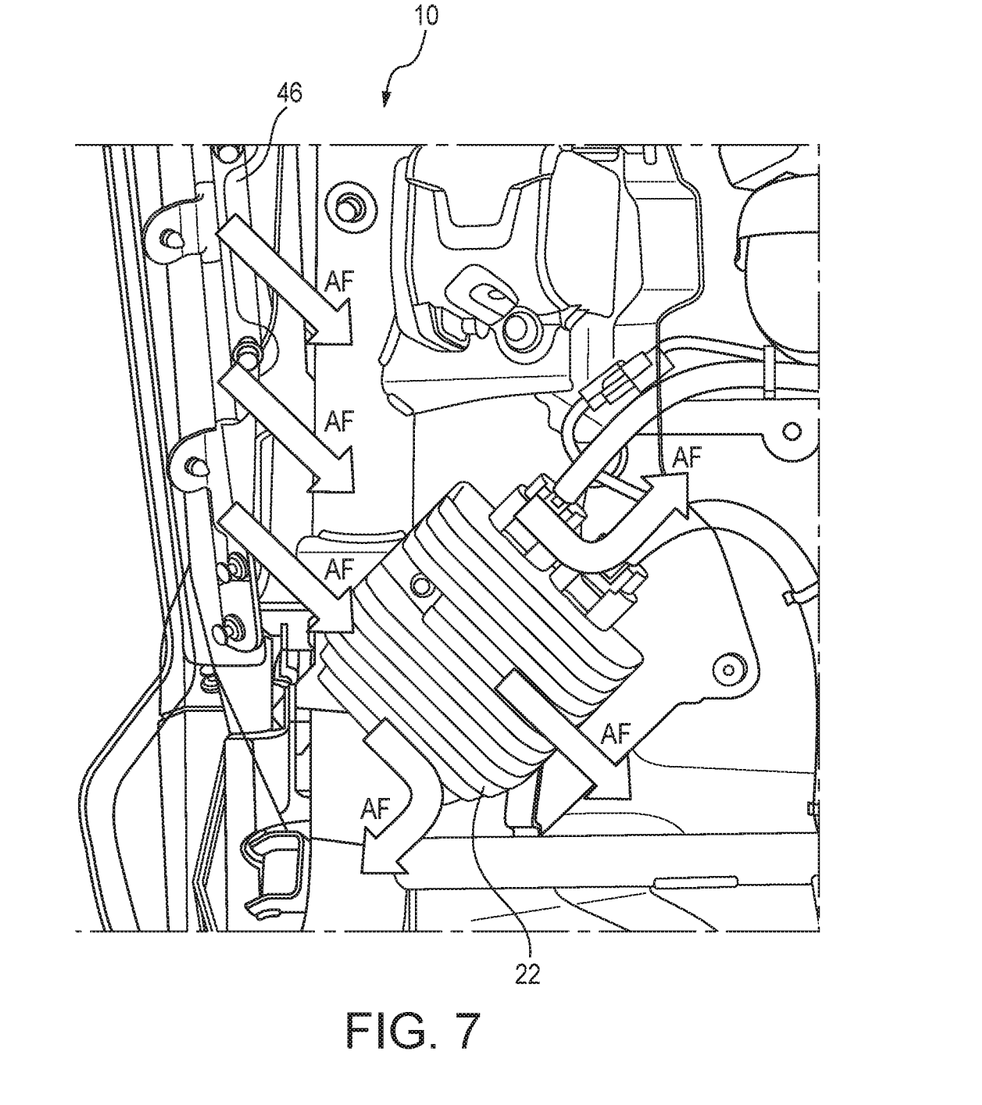
FIG. 7 is a rear view of the air intake of FIG. 5, without the cover, to illustrate airflow over the regulator to cool the regulator.

FIGS. 5-7 illustrate a system for supplying the regulator 22 with fresh airflow (represented by arrows for illustration purposes and labeled AF in FIGS. 5-7) from outside of the vehicle 10 for cooling the regulator 22 to ensure its continued operation as intended. In the vehicle 10 illustrated in FIGS. 5-7, in which the engine 16 is located vertically below and longitudinally rearward of the cabin 18, the body 14, directly longitudinally rearward of a door 44 to the cabin 18, may include an air intake 46. The air intake 46 may be formed integrally within the body 14, and may further include a mesh covering 48 to prevent the intake of large debris, such as rocks, sticks, branches, twigs, and the like.

As the vehicle 10 is moving, airflow AF is directed into the air intake 46 as illustrated in FIGS. 5-6, and passes over the regulator 22 as illustrated in FIG. 7. In order to facilitate cooling of the regulator 22, warm airflow AF is then passed out through the vented areas 42, as illustrated in FIG. 4. The location of the outlet 42 also ensures that debris does not collect in the cover 32, but rather passes out into the wheel well 24.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A vehicle, comprising:
a vehicle frame;
a body on the vehicle frame, the vehicle frame and the body defining a wheel well;
a wheel disposed in the wheel well;
an engine for propelling the vehicle;
an electrical system for providing electrical power to the engine, comprising:
a regulator for maintaining a constant voltage across the electrical system, the regulator being disposed in the wheel well;
a cover disposed in the wheel well between the regulator and the wheel; and
an air intake disposed in the body for directing airflow into a portion of the wheel well defined by the cover and housing the regulator.

2. The vehicle of claim 1 wherein the vehicle comprises:
first and second front wheels;
first and second rear wheels, the first rear wheel being disposed in a first rear wheel well and the second rear wheel being disposed in a second rear wheel well; and
wherein the regulator and the cover are disposed in the first rear wheel well.

3. The vehicle of claim 2 wherein the air intake is disposed in the body longitudinally forward of the first rear wheel well.

4. The vehicle of claim 3 wherein the air intake comprises:
a mesh screen.

5. The vehicle of claim 1 wherein the cover further comprises:
an outlet for directing airflow away from the regulator and into the wheel well.

6. The vehicle of claim 5 wherein the outlet for directing airflow away from the regulator and into the wheel well is located vertically beneath the regulator.

7. The vehicle of claim 6 wherein the airflow is directed away from the regulator after passing through a space between the regulator and the cover to cool the regulator.

8. The vehicle of claim 7 wherein the cover is disposed and constructed to deflect debris away from the regulator thrown by the wheel in the wheel well during operation of the vehicle.

9. The vehicle of claim 8 wherein the cover is made of plastic.

10. A vehicle, comprising:
a vehicle frame;
a body on the vehicle frame, the vehicle frame and the body defining first and second rear wheel wells;
first and second front wheels rotatably attached to the vehicle frame;
first and second rear wheels rotatably attached to the vehicle frame, the first rear wheel being disposed in the first rear wheel well and the second rear wheel being disposed in the second rear wheel well;
an engine for propelling the vehicle;
an electrical system for providing electrical power to the engine, comprising:
a regulator for maintaining a constant voltage across the electrical system, the regulator being disposed in the first rear wheel well;
a cover disposed in the first rear wheel well between the regulator and the first rear wheel; and an air intake disposed in the body for directing airflow into a portion of the first rear wheel well defined by the cover and housing the regulator.

11. The vehicle of claim 10 wherein the air intake is disposed in the body longitudinally forward of the first rear wheel well.

12. The vehicle of claim 11 wherein the air intake is disposed in the fender longitudinally forward of the first rear wheel well.

13. The vehicle of claim 10 wherein the cover further comprises:
an outlet for directing airflow away from the regulator and into the wheel well.

14. The vehicle of claim 13 wherein the outlet for directing airflow away from the regulator and into the wheel well is located vertically beneath the regulator.

15. The vehicle of claim 14 wherein the airflow is directed away from the regulator after passing through a space between the regulator and the cover to cool the regulator.

16. The vehicle of claim 15 wherein the cover is disposed and constructed to deflect debris away from the regulator thrown by the wheel in the wheel well during operation of the vehicle.

17. The vehicle of claim 16 wherein the cover is made of plastic.

18. A vehicle, comprising:
a vehicle frame;
a body on the vehicle frame, the vehicle frame and the body defining first and second rear wheel wells;
first and second front wheels rotatably attached to the vehicle frame;
first and second rear wheels rotatably attached to the vehicle frame, the first rear wheel being disposed in the first rear wheel well and the second rear wheel being disposed in the second rear wheel well;
an engine for propelling the vehicle;
an electrical system for providing electrical power to the engine, comprising:
a regulator for maintaining a constant voltage across the electrical system, the regulator being disposed in the first rear wheel well; and
a cover disposed in the first rear wheel well between the regulator and the first rear wheel.

19. The vehicle of claim 18 further comprising:
an air intake disposed in the body longitudinally forward of the first rear wheel well for directing airflow into a portion of the first rear wheel well defined by the cover and housing the regulator.

20. The vehicle of claim 19 wherein the cover further comprises:
an outlet for directing airflow away from the regulator and into the first rear wheel well; and
wherein the airflow is directed away from the regulator after passing through a space between the regulator and the cover to cool the regulator.

* * * * *